(12) United States Patent
Tanaka

(10) Patent No.: US 10,859,880 B2
(45) Date of Patent: Dec. 8, 2020

(54) LIQUID CRYSTAL DISPLAY DEVICE COMPRISING FIRST AND SECOND ELECTRODES RESPECTIVELY DISPOSED OUTSIDE OF DIAGONALLY OPPOSITE FIRST AND SECOND CORNER PORTIONS OF A PIXEL AREA

(71) Applicant: SEIKO EPSON CORPORATION, Tokyo (JP)

(72) Inventor: Nobutaka Tanaka, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/653,008

(22) Filed: Oct. 15, 2019

(65) Prior Publication Data
US 2020/0117060 A1 Apr. 16, 2020

(30) Foreign Application Priority Data
Oct. 16, 2018 (JP) .................................. 2018-194857

(51) Int. Cl.
G02F 1/1343 (2006.01)
G02F 1/1345 (2006.01)
G02F 1/1333 (2006.01)

(52) U.S. Cl.
CPC ...... *G02F 1/134309* (2013.01); *G02F 1/1345* (2013.01); *G02F 1/13452* (2013.01); *G02F 1/13458* (2013.01); *G02F 2001/133388* (2013.01); *G02F 2201/121* (2013.01)

(58) Field of Classification Search
CPC ... G03B 33/12; G03B 21/006; G02F 2203/62; G02F 2201/501; G02F 2001/136218; G02F 2201/12; G02F 2001/133388
See application file for complete search history.

(56) References Cited

U.S. PATENT DOCUMENTS

| 2009/0296030 A1* | 12/2009 | Ikebe | ................ G02F 1/134363 349/110 |
| 2009/0296036 A1* | 12/2009 | Ikebe | ................ G02F 1/134363 349/139 |
| 2012/0086878 A1* | 4/2012 | Mochiku | ............... G02F 1/1339 349/5 |

(Continued)

FOREIGN PATENT DOCUMENTS

| JP | 10133216 A | * | 5/1998 | ....... G02F 1/136286 |
| JP | 2000194013 A | * | 7/2000 | ........... G02F 1/1345 |

(Continued)

*Primary Examiner* — Paul C Lee
(74) *Attorney, Agent, or Firm* — Oliff PLC

(57) ABSTRACT

In a liquid crystal device, on a first substrate, a first electrode to which a potential higher than a common potential is applied and a second electrode to which a potential lower than the common potential is applied are provided at the outside of a pixel area. The first electrode and the second electrode respectively extend along different portions of the outer edge of the pixel area, and are not parallel to each other. At least one of the first electrode and the second electrode is provided on all sides of the pixel area. For example, the first electrodes extend across the entirety or substantially entirety of the first side and the second side, and the second electrodes extend across the entirety or substantially entirety of the third side and the fourth side.

4 Claims, 9 Drawing Sheets

(56) References Cited

U.S. PATENT DOCUMENTS

2012/0086898 A1* 4/2012 Tanaka .............. G02F 1/133734
349/123
2012/0307176 A1* 12/2012 Tanaka ................. G02F 1/1343
349/61
2017/0337864 A1* 11/2017 Igeta ................ G02F 1/136213

FOREIGN PATENT DOCUMENTS

| JP | 2002258319 A | * | 9/2002 | ......... G02F 1/13458 |
| --- | --- | --- | --- | --- |
| JP | 2007133363 A | * | 5/2007 | .......... G03B 21/006 |
| JP | 2007-316119 A | | 12/2007 | |
| JP | 2012-083513 A | | 4/2012 | |
| JP | 2014-119683 A | | 6/2014 | |
| JP | 2017-207656 A | | 11/2017 | |
| JP | 2018-105987 A | | 7/2018 | |
| JP | 2018-124310 A | | 8/2018 | |

* cited by examiner

LIQUID CRYSTAL DISPLAY DEVICE COMPRISING FIRST AND SECOND ELECTRODES RESPECTIVELY DISPOSED OUTSIDE OF DIAGONALLY OPPOSITE FIRST AND SECOND CORNER PORTIONS OF A PIXEL AREA

The present application is based on, and claims priority from JP Application Serial Number 2018-194857, filed Oct. 16, 2018, the disclosure of which is hereby incorporated by reference herein in its entirety.

BACKGROUND

1. Technical Field

The present disclosure relates to a liquid crystal device in which a liquid crystal layer is held between a pair of substrates, and an electronic apparatus.

2. Related Art

A liquid crystal device includes a first substrate provided with a plurality of pixel electrodes and a first alignment film, a second substrate provided with a common electrode and a second alignment film, and a seal material for bonding the first substrate and the second substrate; further, a liquid crystal layer is held in a region surrounded by the seal material between the first substrate and the second substrate. In such a liquid crystal device, light from a light source enters from the side of the second substrate, and the postures of the liquid crystal molecules are changed by the pixel electrodes so that an image is displayed. In this case, the liquid crystal layer is caused to flow due to the postures of the liquid crystal molecules being switched. As a result, impurities having been mixed during the filling of the liquid crystal layer and impurities eluted from the seal material are activated by photoirradiation, and the impurities aggregate in an end portion of the display region, so that deterioration in display quality such as image ghosting (spots) occurs. Therefore, it is proposed to suppress the image ghosting and the like by causing the impurities to aggregate at a position distanced from the display region.

On the other hand, a structure is proposed in which a first peripheral electrode to which a potential higher than a common potential is applied and a second peripheral electrode to which a potential lower than the common potential is applied are disposed in parallel to each other at the outside of a pixel area (see JP-A-2012-83513). In addition, a structure is proposed in which, on three sides among four sides of a pixel area, a first electrode to which a potential higher than a common potential is applied and a second electrode to which a potential lower than the common potential is applied are alternately disposed (see JP-A-2017-207656).

In the configuration described in JP-A-2012-83513, for example, in a case in which the first peripheral electrode is disposed on the outside of the second peripheral electrode, there is a problem in that, when negative ionic impurities are directed toward the first peripheral electrode, the second peripheral electrode becomes a barrier so that it is difficult for the ionic impurities to reach the first peripheral electrode. In addition, in the configuration described in JP-A-2017-207656, ionic impurities directed toward a side, among the four sides of the pixel area, where the first electrode and the second electrode are not disposed are not trapped by any of the first electrode and the second electrode, so that there arises a problem in that the ionic impurities aggregate within the pixel area. Therefore, in the configurations described in JP-A-2012-83513 and JP-A-2017-207656, there is a problem in that negative ionic impurities cannot be efficiently trapped at the outside the pixel area.

SUMMARY

In order to solve the above-described problems, an aspect of a liquid crystal device according to the present disclosure includes a first substrate, a second substrate opposite the first substrate, a liquid crystal layer disposed between the first substrate and the second substrate, a pixel area where pixels are arranged in a first direction and a second direction intersecting the first direction, first electrodes which extend along the pixels arranged in the first direction on both sides of the pixel area, and to which a potential higher than a common potential is applied, and second electrodes which extend along the pixels arranged in the first direction on both sides of the pixel area, and to which a potential lower than the common potential is applied.

Another aspect of a liquid crystal device according to the present disclosure includes a first substrate, a second substrate opposite the first substrate, a liquid crystal layer disposed between the first substrate and the second substrate, a pixel area in which pixels are arranged in a first direction and a second direction intersecting he first direction, a first electrode which extends in the first direction and the second direction at an outside of the pixel area, and to which a potential higher than a common potential is applied, and a second electrode which extends in the first direction and the second direction at the opposite side of the pixel area from a side where the first electrode is provided, and to which a potential lower than the common potential is applied.

The liquid crystal device to which the present disclosure is applied may be used in various types of electronic apparatuses such as a direct-view-type display apparatus and a projection-type display apparatus.

DESCRIPTION OF EXEMPLARY EMBODIMENTS

Figure 1:
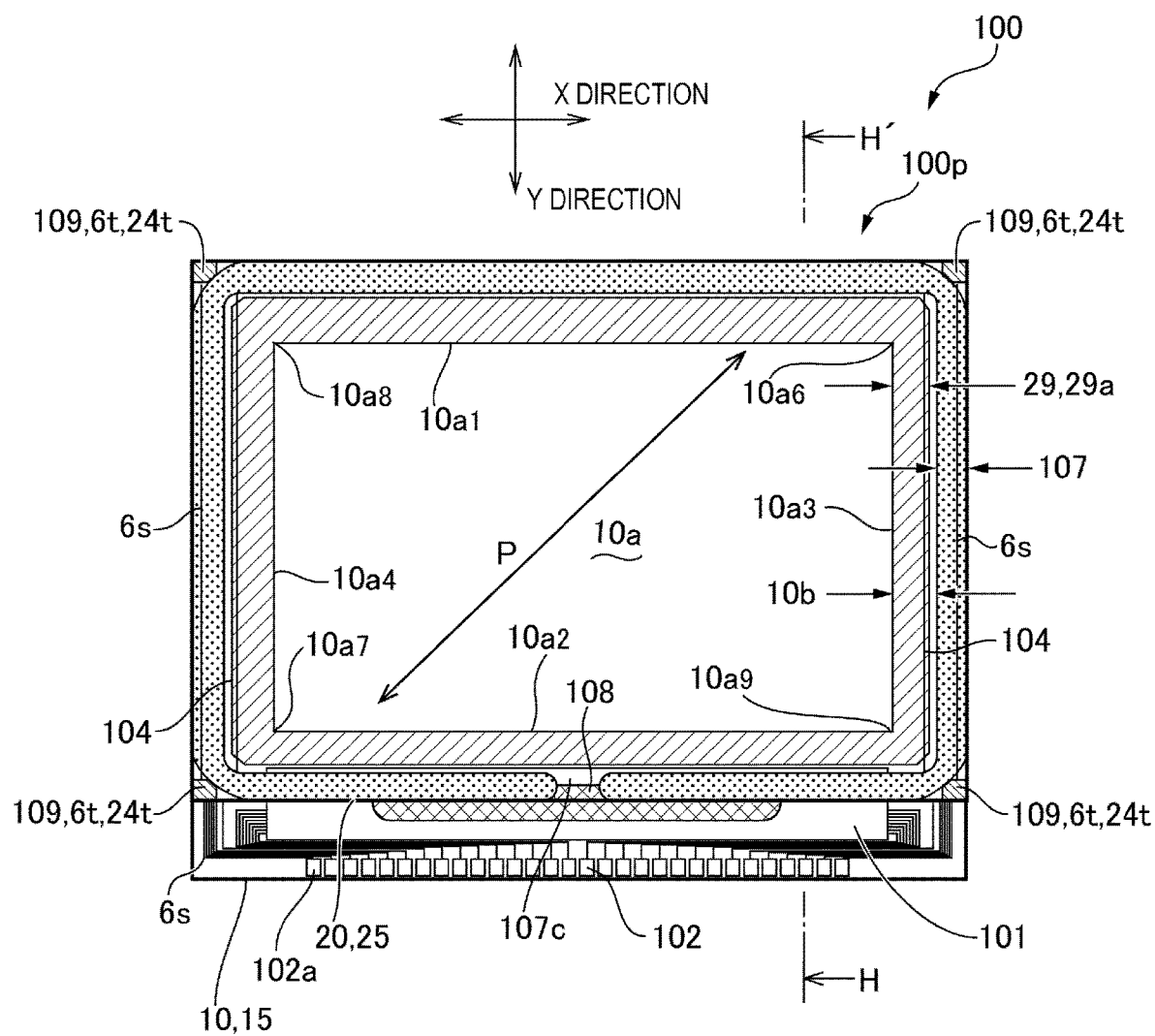
FIG. 1 is a plan view of an aspect of a liquid crystal device according to a first embodiment of the present disclosure.

Exemplary embodiments of the disclosure will be described below with reference to the drawings. Note that, in each of the figures to be referred to in the following description, to illustrate each layer, each member, and the like in a recognizable size in the drawings, each layer, each member, and the like are illustrated at a different scale. Further, when description of layers formed on a first substrate is given, an upper layer side or a surface side refers to a side on which a liquid crystal layer is positioned (a side on which a second substrate is positioned), and a lower layer side refers to a side opposite to the side on which the liquid crystal layer is positioned (a side opposite to the side on which the second substrate is positioned). When description of layers formed on the second substrate is given, an upper layer side or a surface side refers to a side on which the liquid crystal layer is positioned (a side on which the first substrate is positioned), and a lower surface side refers to a side opposite to the side on which the liquid crystal layer is positioned (a side opposite to the side on which the first substrate is positioned). Furthermore, in the following description, directions intersecting with each other are respectively referred to as a first direction and a second direction, and "X" is assigned to the first direction and "Y" is assigned to the second direction in the description.

First Embodiment

Overall Configuration

Figure 2:
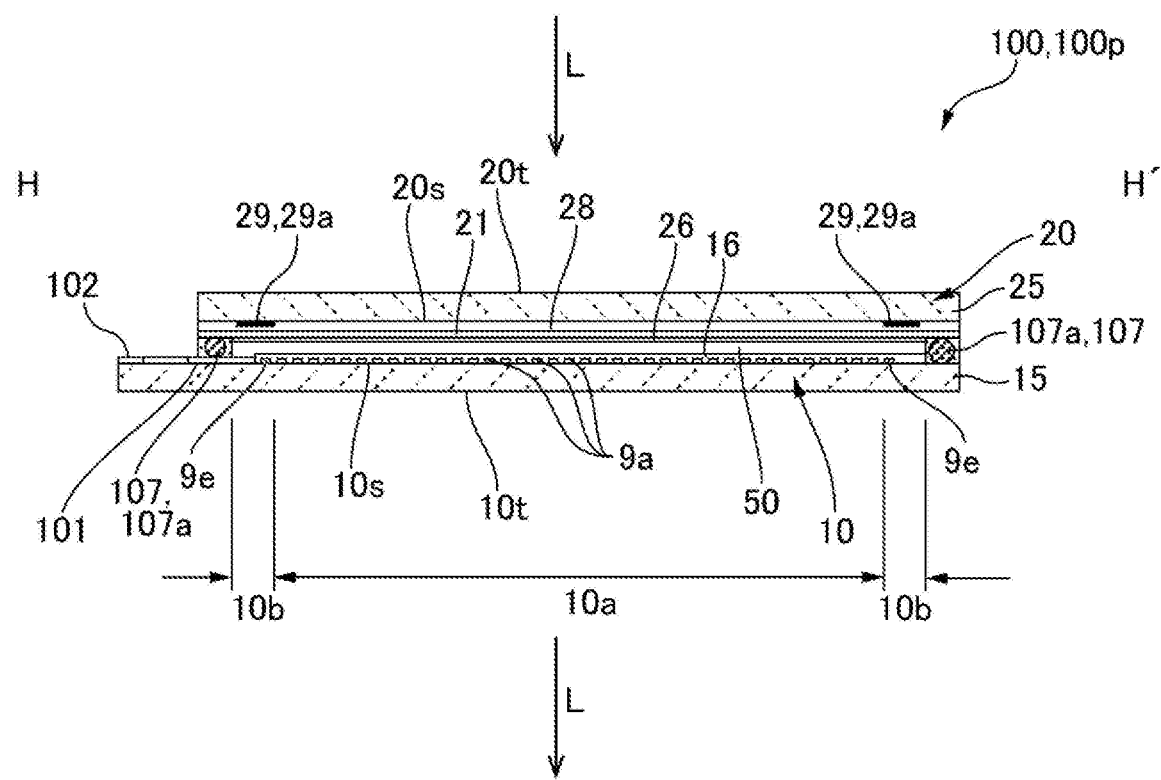
FIG. 2 is an H-H' cross-sectional view of the liquid crystal device illustrated in FIG. 1.
Figure 3:
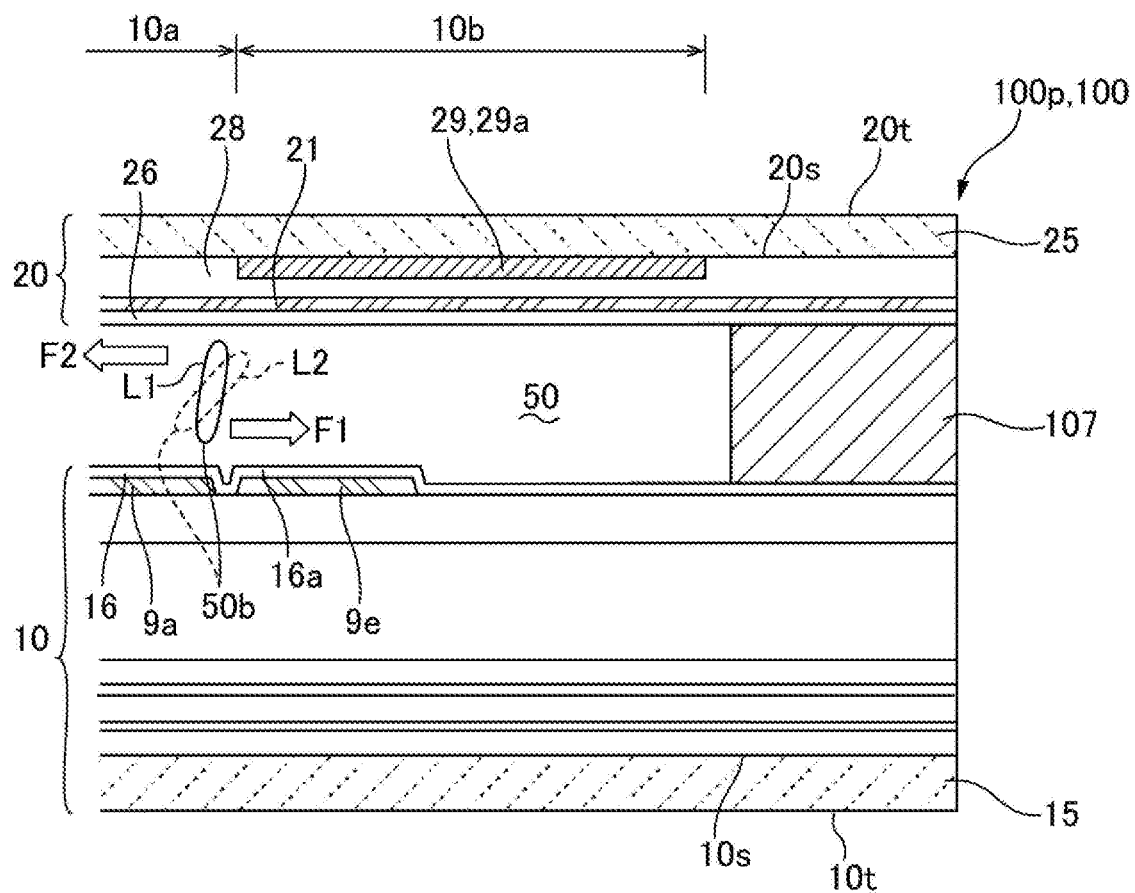
FIG. 3 is an explanatory diagram of a liquid crystal layer and the like illustrated in FIG. 2.

FIG. 1 is a plan view of an aspect of a liquid crystal device 100 according to a first embodiment of the present disclosure, in which illustrated is a state where the liquid crystal device 100 is viewed together with its constituent elements from a side of a second substrate 25. FIG. 2 is an H-H' cross-sectional view of the liquid crystal device 100 illustrated in FIG. 1. FIG. 3 is an explanatory diagram of a liquid crystal layer 50 and the like illustrated in FIG. 2. As illustrated in FIGS. 1 and 2, the liquid crystal device 100 includes a liquid crystal panel 100p in which a light-transmissive first substrate 15 and the light-transmissive second substrate 25 are bonded to each other by a seal material 107 with a prescribed gap interposed therebetween, where the seal material 107 is provided in a frame shape along the outer edge of the second substrate 25. The first substrate 15 is a base material of an element substrate 10, and the second substrate 25 is a base material of a counter substrate 20.

The seal material 107 is an adhesive containing a photo-curable resin, a thermosetting resin or the like, in which a gap material 107a such as glass fiber or glass beads is arranged to set a distance between the two substrates to a predetermined value. In the liquid crystal device 100, the liquid crystal layer 50 is provided in a region surrounded by the seal material 107 among the overall region between the first substrate 15 and the second substrate 25. In the seal material 107, a cut portion 107c used as a liquid crystal injection port is formed, and such a cut portion 107c is sealed by a sealing material 108 after a liquid crystal material is injected. Note that, after forming the seal material 107 in an endless frame shape on the first substrate 15, the liquid crystal layer 50 may be provided on an inner side thereof, and the second substrate 25 may then be bonded to the first substrate 15 by the seal material 107.

In the embodiment, the first substrate 15 and the second substrate 25 both have a quadrangle shape, and in a substantially central portion of the liquid crystal device 100, a pixel area 10a is provided as a quadrangle area. Accordingly, the pixel area 10a includes, on its outer edge, a first side 10a1, a second side 10a2 opposing the first side 10a1, a third side 10a3 intersecting with the first side 10a1, and a fourth side 10a4 opposing the third side 10a3. Thus, the pixel area 10a includes a first corner portion 10a6 between the first side 10a1 and the third side 10a3, a second corner portion 10a7 between the second side 10a2 and the fourth side 10a4, a third corner portion 10a8 between the first side 10a1 and the fourth side 10a4, and a fourth corner portion 10a9 between the second side 10a2 and the third side 10a3. In accordance with the above-described shapes, the seal material 107 is also provided in a substantially quadrangular shape, and an outer peripheral area 10b having a quadrangular frame shape is present between the outer edge of the pixel area 10a and the seal material 107 on the outside of the pixel area 10a.

On the first substrate 15, a data-line driving circuit 101 and a plurality of terminals 102 are formed along a side of the first substrate 15, and along another side adjacent to this side, a scanning-line driving circuit 104 is formed. A flexible wiring substrate (not illustrated) is coupled to the terminals 102, and various potentials and various signals are input to the first substrate 15 via the flexible wiring substrate.

Of one surface 10s and the other surface 10t of the first substrate 15, on a side of the one surface 10s thereof facing the second substrate 25, a plurality of pixels each including a transistor (not illustrated) and a pixel electrode 9a is formed in matrix form in the pixel area 10a, and an alignment film 16 (first alignment film) is formed on the upper layer side of the pixel electrode 9a. In the embodiment, in the pixel area 10a, the plurality of pixels provided with the pixel electrodes 9a is arranged in a first direction X and a second direction Y.

In addition, on the one surface 10s of the first substrate 15, a peripheral electrode 9e that traps ionic impurities is formed in the outer peripheral area 10b sandwiched between the pixel area 10a and the seal material 107. A detailed configuration of the peripheral electrode 9e will be described below; in the embodiment, the peripheral electrode 9e is constituted by the same conductive film as that of the pixel electrode 9a. Although not illustrated, a dummy pixel electrode formed simultaneously with the pixel electrode 9a may be formed in the outer peripheral area 10b.

Of one surface 20s and the other surface 20t of the second substrate 25, on a side of the one surface 20s thereof facing the first substrate 15, a common electrode 21, to which a common potential Vcom is applied, is formed, and an alignment film 26 (second alignment film) is laminated on a surface of the common electrode 21. The common electrode 21 is formed on a substantially entire surface of the second substrate 25, or is formed as a plurality of band-shaped electrodes extending across the plurality of pixels. In the embodiment, the common electrode 21 is formed on the substantially entire surface of the second substrate 25. In the second substrate 25, a light shielding layer 29 and a protective film 28 are formed on the lower layer side of the common electrode 21 in the frame-shaped outer peripheral area 10b prepared between the seal material 107 and the pixel area 10a. In the embodiment, the light shielding layer 29 is formed as a parting 29a, and a display region is defined by an inner edge of the light shielding layer 29. In the embodiment, an aspect is illustrated in which the pixel area 10a matches the display region. The light shielding layer 29 may be formed as a black matrix portion overlapping, in plan view, with an inter-pixel region sandwiched between adjacent pixel electrodes 9a. In addition, a lens that overlaps, in plan view, with the plurality of pixel electrodes 9a may be configured between the second substrate 25 and the common electrode 21.

In the liquid crystal device 100, at the outside of the seal material 107, inter-substrate conduction electrode portions 24t are formed in four corners on the one surface 20s side of the second substrate 25, and on the one surface 10s side of the first substrate 15, inter-substrate conduction electrode portions 6t are formed in the positions facing the four corners (inter-substrate conduction electrode portions 24t) of the second substrate 25. In the embodiment, the inter-substrate conduction electrode portion 24t is formed of part of the common electrode 21. The inter-substrate conduction electrode portions 6t are conductively connected to a constant potential wiring line 6s to which the common potential Vcom is applied, and the constant potential wiring line 6s is conductively connected to a common potential application terminal 102a among the terminals 102. Inter-substrate conduction materials 109 containing conductive particles are disposed between the inter-substrate conduction electrode portions 6t and the inter-substrate conduction electrode portions 24t, and the common electrode 21 is electrically coupled to the first substrate 15 side via the inter-substrate conduction electrode portions 6t, the inter-substrate conduction materials 109, and the inter-substrate conduction electrode portions 24t. Thus, the common potential Vcom is applied to the common electrode 21 from the side of the first substrate 15.

In the liquid crystal device 100 configured as discussed above, in the embodiment, the pixel electrodes 9a and the common electrode 21 are each formed of a light-transmissive conductive film, such as an indium tin oxide (ITO) film and an indium zinc oxide (IZO) film, and the liquid crystal device 100 is a transmission type liquid crystal device. In the transmission type liquid crystal device 100 configured as discussed above, light that enters from the second substrate 25 side passes through and exits from the first substrate 15, as indicated by an arrow L in FIG. 2, during which the light is modulated so that an image is displayed. Note that the common electrode 21 may be formed of a light-transmissive conductive film, and the pixel electrode 9a may be formed of a reflective conductive film such as an aluminum film. According to such a configuration, the liquid crystal device 100 of a reflection type may be configured. In the reflection type liquid crystal device 100, light that enters from the side of the second substrate 25 is reflected at the first substrate 15 and is emitted from the second substrate 25 again, during which the light is modulated so that an image is displayed.

The liquid crystal device 100 may be used as a color display device of an electronic apparatus such as a mobile computer or a mobile phone, and in this case, a color filter (not illustrated) is formed on the second substrate 25 or the first substrate 15. In the liquid crystal device 100, a polarization film, a phase difference film, a polarizing plate, and the like are disposed in a prescribed orientation with respect to the liquid crystal panel 100p in accordance with the type and the alignment direction of the liquid crystal layer 50 to be used, and the modes of normally-white and normally-black. The liquid crystal device 100 may be used as a light valve of RGB in a projection-type display apparatus (liquid crystal projector) to be described below. In this case, light of each color decomposed through the dichroic mirror for RGB color decomposition is incident as projection light on each liquid crystal device 100 for RGB, and therefore, a color filter is not formed.

In FIG. 3, the alignment films 16 and 26 are a columnar structure (an inclined vertical alignment film/inorganic alignment film) made of a diagonally vapor-deposited film such as $SiO_x$ (x<2), $SiO_2$, $TiO_2$, MgO, $Al_2O_3$, $In_2O_3$, $Sb_2O_3$, and $Ta_2O_5$. In the alignment films 16 and 26, the alignment restricting force is anti-parallel, and a nematic liquid crystal compound having negative dielectric anisotropy used in the liquid crystal layer 50 is inclined in a vertical alignment manner in a posture inclined in a set direction (pretilt direction) relative to a normal direction with respect to the first substrate 15 and a normal direction with respect to the second substrate 25, as schematically illustrated in the drawing in which liquid crystal molecules 50b are indicated by a solid line L1. Then, the liquid crystal molecules 50b are inclined, as indicated by a dotted line L2, by an electric field between the pixel electrode 9a and the common electrode 21. In this way, the liquid crystal device 100 is configured as a liquid crystal device of a normally black vertical alignment (VA) mode.

In the embodiment, as illustrated in FIG. 1, the alignment films 16 and 26 give, to the liquid crystal molecules 50b, a pretilt that is inclined in an orientation P forming an angle of 45 degrees with respect to the first side 10a1, and the liquid crystal molecules 50b are aligned in a direction along a diagonal line connecting the first corner portion 10a6 and the second corner portion 10a7 among the four corner portions of the quadrangle pixel area 10a. Note that, of the liquid crystal molecules 50b, the liquid crystal molecules 50b located near the surface of the first substrate 15 are in a state in which one end of a molecular chain is retained on the side of the first substrate 15, and the liquid crystal molecules 50b located near the surface of the second substrate 25 are in a state in which the other end of the molecular chain is retained on the side of the second substrate 25.

Configuration of Peripheral Electrode 9e

Figure 4:
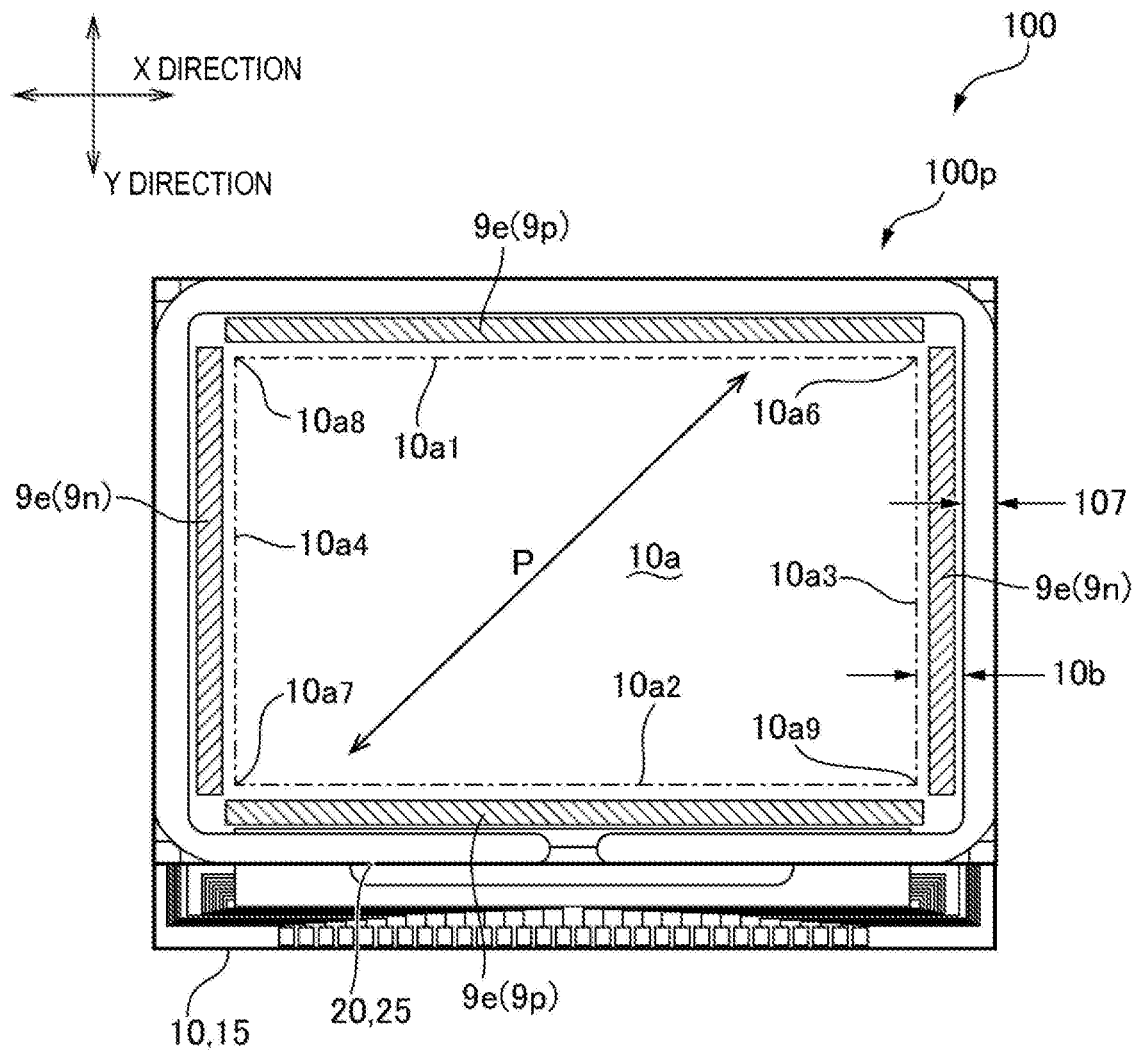
FIG. 4 is an explanatory diagram of a peripheral electrode provided in the liquid crystal device illustrated in FIG. 1.
Figure 5:
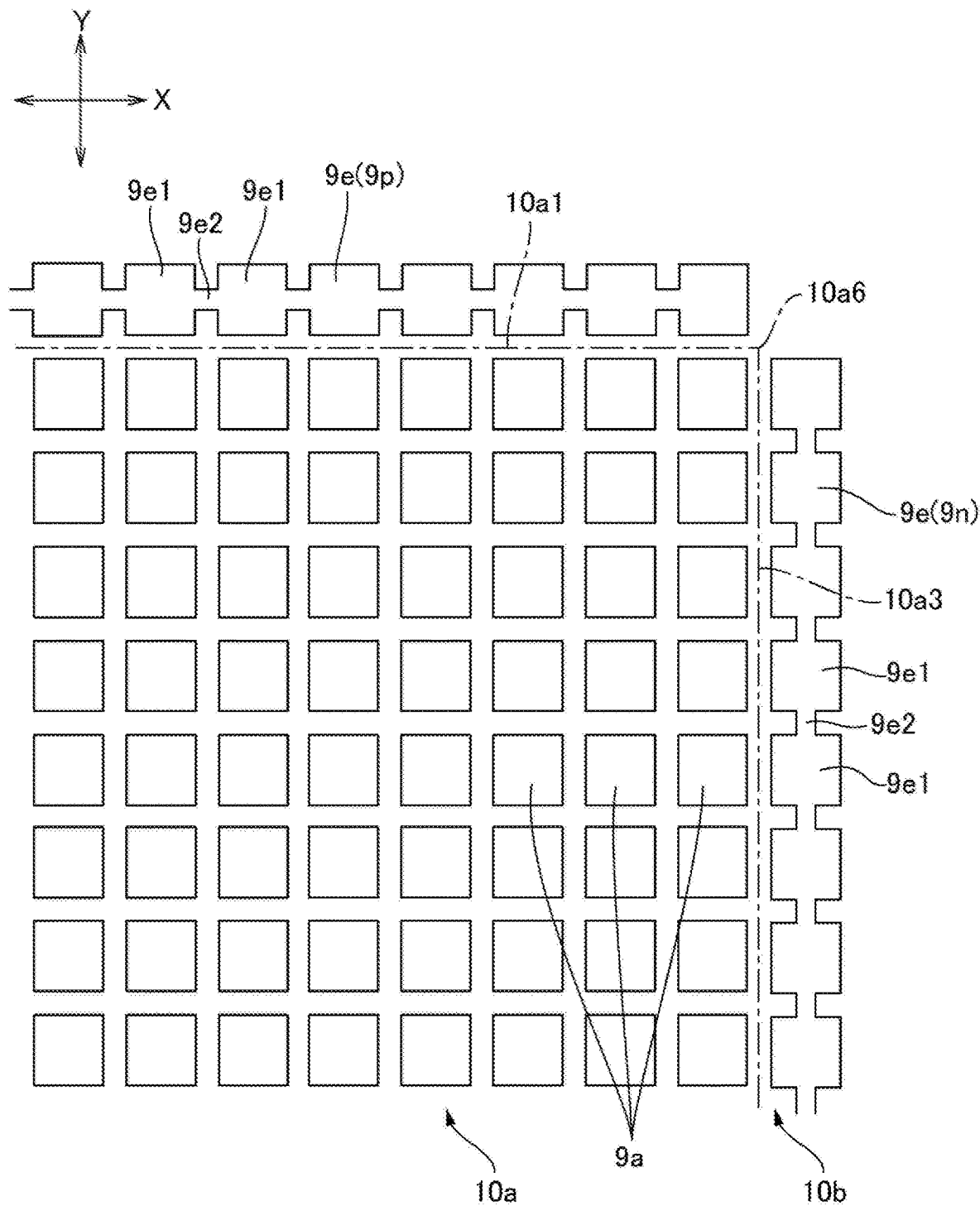
FIG. 5 is an explanatory diagram illustrating a configuration example of the peripheral electrode illustrated in FIG. 4.

FIG. 4 is an explanatory diagram of the peripheral electrode 9e provided in the liquid crystal device 100 illustrated in FIG. 1, and illustrates the pixel area 10a, the seal material 107, and the like among the constituent elements illustrated in FIG. 1 so as to indicate a positional relationship with the constituent elements illustrated in FIG. 1. FIG. 5 is an explanatory diagram illustrating a configuration example of the peripheral electrode 9e illustrated in FIG. 4.

As illustrated in FIGS. 2 and 3, in the embodiment, the peripheral electrode 9e is formed in the outer peripheral area 10b, at the outside of the pixel area 10a, on the one surface 10s side of the first substrate 15. In the embodiment, the peripheral electrode 9e is formed of a conductive film having been formed simultaneously with the pixel electrode 9a. Here, a prescribed voltage is applied between the peripheral electrode 9e and the common electrode 21. Accordingly, as described above with reference to FIG. 3, when a voltage is applied to the liquid crystal layer 50 between the pixel electrode 9a and the common electrode 21 to shake the liquid crystal molecules 50b, a flow occurs in the liquid crystal layer 50, as indicated by arrows F1 and F2. As a result, impurities having been mixed during the filling of the liquid crystal layer 50 and impurities eluted from the seal material 107 are activated by photoirradiation from the light source, and move to the end portion of the pixel area 10a. Here, a voltage is applied between the peripheral electrode 9e and the common electrode 21 at the outside of the pixel area 10a. Therefore, ionic impurities that have moved to the end portion of the pixel area 10a are trapped by the peripheral electrode 9e, and therefore are unlikely to aggregate at the inside of the pixel area 10a.

Here, negative ionic impurities and positive ionic impurities may be contained in the ionic impurities that have moved to the end portion of the pixel area 10a, and when a voltage of one polarity is applied between the peripheral electrode 9e and the common electrode 21, none of the negative ionic impurities and positive ionic impurities can be trapped.

Therefore, in the embodiment, as illustrated in FIG. 4, the first substrate 15 is provided with, as the peripheral electrodes 9e, a first electrode 9p extending along the outer edge of the pixel area 10a at the outside of the pixel area 10a, and a second electrode 9n extending along the outer edge of the pixel area 10a at a position different from that of the first electrode 9p at the outside of the pixel area 10a. Here, a potential higher than the common potential Vcom is applied to the first electrode 9p, and a potential lower than the common potential Vcom is applied to the second electrode 9n. For example, the common potential Vcom is 0V, the potential applied to the first electrode 9p is +5V, and the voltage applied to the second electrode 9n is −5V.

As illustrated in FIG. 5, for example, the peripheral electrodes 9e (the first electrode 9p and the second electrode 9n) have a shape in which quadrangular regions 9e1 that are patterned in the same manner as the pixel electrodes 9a are coupled to each other with coupling portions 9e2. Accordingly, when a potential is applied to an end portion or the like of each of the first electrode 9p and the second electrode 9n, a prescribed potential can be applied to the entire first electrode 9p and the entire second electrode 9n. In the embodiment, the peripheral electrode 9e is constituted by aligning the quadrangular regions 9e1 of the same size as the pixel electrodes 9a in one row, but the peripheral electrode 9e may be constituted in a mode in which the quadrangular regions 9e1 of the same size as the pixel electrodes 9a are aligned in a plurality of rows.

As illustrated in FIG. 4, in the embodiment, at the outside of the pixel area 10a, the first electrodes 9p are provided to extend along the first direction X on both sides of the pixel area 10a, and the second electrodes 9n are provided to extend along the second direction Y on both sides of the pixel area 10a. More specifically, at least one of the first electrode 9p and the second electrode 9n is provided on all of the four sides including the first side 10a1, the second side 10a2, the third side 10a3, and the fourth side 10a4 of the pixel area 10a. For example, the first electrodes 9p are provided along the first side 10a1 and the second side 10a2, and the second electrodes 9n are provided along the third side 10a3 and the fourth side 10a. In the embodiment, the first electrodes 9p extend across the entirety or substantially across the entirety of the first side 10a1 and the second side 10a2. The second electrodes 9n extend across the entirety or substantially across the entirety of the third side 10a3 and the fourth side 10a4. Accordingly, the first electrode 9p and the second electrode 9n extend along all or substantially all of the pixels arranged in the first direction X and the pixels arranged in the second direction Y, respectively.

Thus, at least one of the first electrode 9p and the second electrode 9n extends from the outside of all the corner portions including the first corner portion 10a6, the second corner portion 10a7, the third corner portion 10a8, and the fourth corner portion 10a9 of the pixel area 10a. In the embodiment, the first electrode 9p and the second electrode 9n respectively extend in mutually different directions from the outside of the same corner portion among the first corner portion 10a6, the second corner portion 10a7, the third corner portion 10a8, and the fourth corner portion 10a9. More specifically, from the outside of the first corner portion 10a6, the first electrode 9p extends along the first side 10a1, and the second electrode 9n extends also from the outside of the first corner portion 10a6 along the third side 10a3. From the outside of the second corner portion 10a7, the first electrode 9p extends along the second side 10a2, and the second electrode 9n extends also from the outside of the second corner portion 10a7 along the fourth side 10a4.

Main Effects of the Embodiment

As described above, in the embodiment, the first substrate 15 is provided with the first electrodes 9p to which a potential higher than the common potential Vcom is applied and the second electrodes 9n to which a potential lower than the common potential Vcom is applied. Thus, negative ionic impurities are trapped by the first electrodes 9p and positive ionic impurities are trapped by the second electrodes 9n. Because of this, both the negative ionic impurities and positive ionic impurities can be trapped at the outside of the pixel area 10a.

As the peripheral electrodes 9e, there are provided the first electrode 9p extending along the outer edge of the pixel area 10a at the outside of the pixel area 10a, and the second electrode 9n extending along the outer edge of the pixel area 10a at a position different from that of the first electrode 9p at the outside of the pixel area 10a. That is, the first electrode 9p and the second electrode 9n respectively extend along different portions of the outer edge of the pixel area 10a and are not parallel to each other. Thus, unlike the case in which the first electrode 9p is disposed in parallel to the second electrode 9n on the outside of the second electrode 9n, the second electrode 9n is unlikely to become a barrier against negative ionic impurities to be directed toward the first electrode 9p. In addition, unlike the case in which the second electrode 9n is disposed in parallel to the first electrode 9p on the outside of the first electrode 9p, the first electrode 9p is unlikely to become a barrier against positive ionic impurities to be directed toward the second electrode 9n. Because of this, both the negative ionic impurities and positive ionic impurities can be efficiently trapped at the outside of the pixel area 10a.

In the embodiment, at least one of the first electrode 9p and the second electrode 9n is provided on all the sides (the first side 10a1, second side 10a2, third side 10a3, and fourth side 10a4) of the pixel area 10a. Further, the first electrodes 9p extend across the entirety or substantially across the entirety of the first side 10a1 and the second side 10a2, and the second electrodes 9n extend across the entirety or substantially across the entirety of the third side 10a3 and the fourth side 10a4. Therefore, the entire periphery of the outer peripheral area 10b can be used for trapping the ionic impurities. Accordingly, since the amount of ionic impurities that can be trapped is large, it is possible to suppress the ionic impurities spreading out into the pixel area 10a. Because of this, degradation in image quality is unlikely to occur caused by the ionic impurities spreading out into the pixel area 10a.

Additionally, in the embodiment, both the first electrode 9p and the second electrode 9n are located near the diagonally-positioned corner portions (the first corner portion 10a6 and the second corner portion 10a7) located in the orientation P in which the pretilt is given to the liquid crystal molecules 50b. Therefore, even when the ionic impurities tend to aggregate in the first corner portion 10a6 and the second corner portion 10a7, both the negative ionic impurities and positive ionic impurities attempting to aggregate in the first corner portion 10a6 and the second corner portion 10a7 can be efficiently trapped at the outside the pixel area 10a.

Second Embodiment

Figure 6:
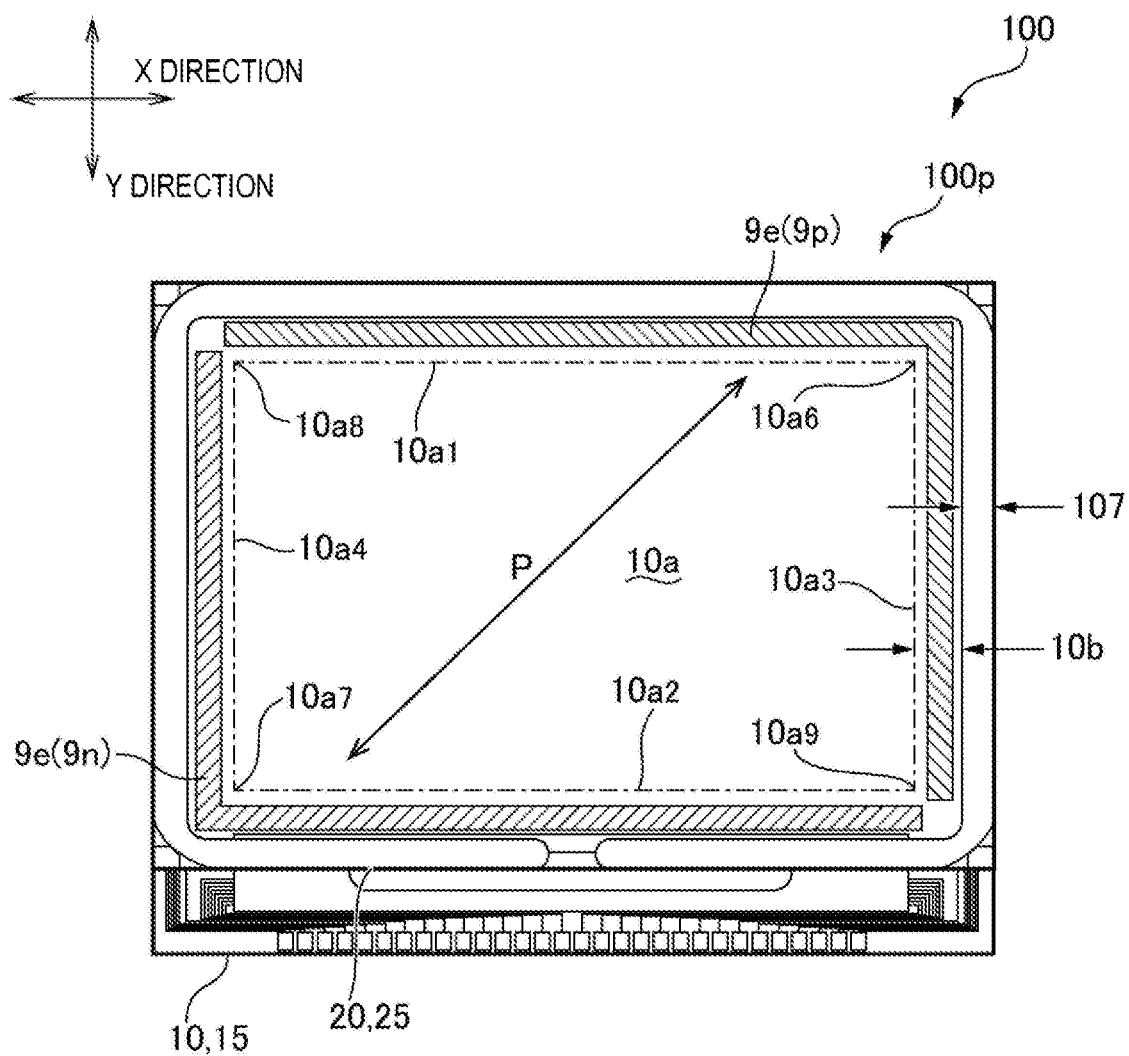
FIG. 6 is an explanatory diagram of a liquid crystal device according to a second embodiment according to the present disclosure.

FIG. 6 is an explanatory diagram of a liquid crystal device 100 according to a second embodiment of the present disclosure, in which a configuration of a peripheral electrode 9e, and the like are illustrated. Note that, since the basic configurations of this embodiment and a third embodiment to be described below are the same as the basic configuration of the first embodiment, constituent elements common to the first embodiment are assigned the same reference symbols and description thereof will be omitted.

As illustrated in FIG. 6, also in this embodiment, similarly to the first embodiment, a first substrate 15 is provided with, as peripheral electrodes 9e, a first electrode 9p extending along the outer edge of a pixel area 10a at the outside of the pixel area 10a, and a second electrode 9n extending along the outer edge of the pixel area 10a at a position different from that of the first electrode 9p at the outside of the pixel area 10a. A potential higher than a common potential Vcom is applied to the first electrode 9p, and a potential lower than the common potential Vcom is applied to the second electrode 9n.

In the embodiment, at the outside of the pixel area 10a, the first electrode 9p is provided to extend along a first direction X and a second direction Y, and the second electrode 9n is provided, on the opposite side of the pixel area 10a to the side where the first electrode 9a is provided, so as to extend along the first direction X and the second direction Y. More specifically, also in this embodiment, similarly to the first embodiment, at least one of the first electrode 9p and the second electrode 9n is provided on all of four sides including a first side 10a1, a second side 10a2, a third side 10a3, and a fourth side 10a4 of the pixel area 10a. For example, the first electrode 9p is provided along the first side 10a1 and the third side 10a3, and the second electrode 9n is provided along the second side 10a2 and the fourth side 10a4. In the embodiment, the first electrode 9p extends across the entirety or substantially across the entirety of the first side 10a1 and the third side 10a3. The second electrode 9n extends across the entirety or substantially across the entirety of the second side 10a2 and the fourth side 10a4. Accordingly, the first electrode 9p and the second electrode 9n extend along all or substantially all of the pixels arranged in the first direction X and the pixels arranged in the second direction Y, respectively.

In addition, at least one of the first electrode 9p and the second electrode 9n extends from the outside of a corner portion of the pixel area 10a. The first electrode 9p and the second electrode 9n respectively extend from the outside of different corner portions among a first corner portion 10a6, a second corner portion 10a7, a third corner portion 10a8, and a fourth corner portion 10a9 of the pixel area 10a. More specifically, the first electrode 9p extends, passing through the outside of the first corner portion 10a6, along the first side 10a1 and the third side 10a3, and the portion extending along the first side 10a1 and the portion extending along the third side 10a3 are coupled at the outside of the first corner portion 10a6. The second electrode 9n extends, passing through the outside of the second corner portion 10a7, along the second side 10a2 and the fourth side 10a4, and the portion extending along the second side 10a2 and the portion extending along the fourth side 10a4 are coupled at the outside of the second corner portion 10a7.

As a result, the first electrode 9p and the second electrode 9n respectively extend in mutually different directions from the outside of the same corner portion, as can be seen in the third corner portion 10a8 and the fourth corner portion 10a9. Therefore, at least one of the first electrode 9p and the second electrode 9n extends from the outside of all the corner portions including the first corner portion 10a6, the second corner portion 10a7, the third corner portion 10a8, and the fourth corner portion 10a9 of the pixel area 10a.

As described above, also in this embodiment, similarly to the first embodiment, the first substrate 15 is provided with the first electrode 9p to which a potential higher than the common potential Vcom is applied and the second electrode 9n to which a potential lower than the common potential Vcom is applied. Thus, negative ionic impurities are trapped by the first electrode 9p and positive ionic impurities are trapped by the second electrode 9n. Because of this, both the negative ionic impurities and positive ionic impurities can be trapped at the outside of the pixel area 10a. Further, the first electrode 9p and the second electrode 9n respectively extend along different portions of the outer edge of the pixel area 10a and are not parallel to each other. Because of this, both the negative ionic impurities and positive ionic impurities can be efficiently trapped at the outside the pixel area 10a.

In the embodiment, at least one of the first electrode 9p and the second electrode 9n is provided on all the sides (the first side 10a1, second side 10a2, third side 10a3, and fourth side 10a4) of the pixel area 10a. Further, the first electrode 9p extends across the entirety or substantially across the entirety of the first side 10a1 and the third side 10a3, and the second electrode 9n extends across the entirety or substantially across the entirety of the second side 10a2 and the fourth side 10a4. Therefore, the entire periphery of the outer peripheral area 10b can be used for trapping the ionic impurities. Accordingly, since the amount of ionic impurities that can be trapped is large, it is possible to suppress the ionic impurities spreading out into the pixel area 10a. Because of this, degradation in image quality is unlikely to occur caused by the ionic impurities spreading out into the pixel area 10a.

Additionally, in the embodiment, the first electrode 9p is located in one of the corner portions diagonally positioned in the orientation P (the first corner portion 10a6) in which the pretilt is given to the liquid crystal molecules 50b, and the second electrode 9n is located in the other one of the corner portions (the second corner portion 10a7). Therefore, even when the ionic impurities tend to aggregate in the first corner portion 10a6 and the second corner portion 10a7, both the negative ionic impurities and positive ionic impurities attempting to aggregate in the first corner portion 10a6 and the second corner portion 10a7 can be efficiently trapped at the outside the pixel area 10a.

Third Embodiment

Figure 7:
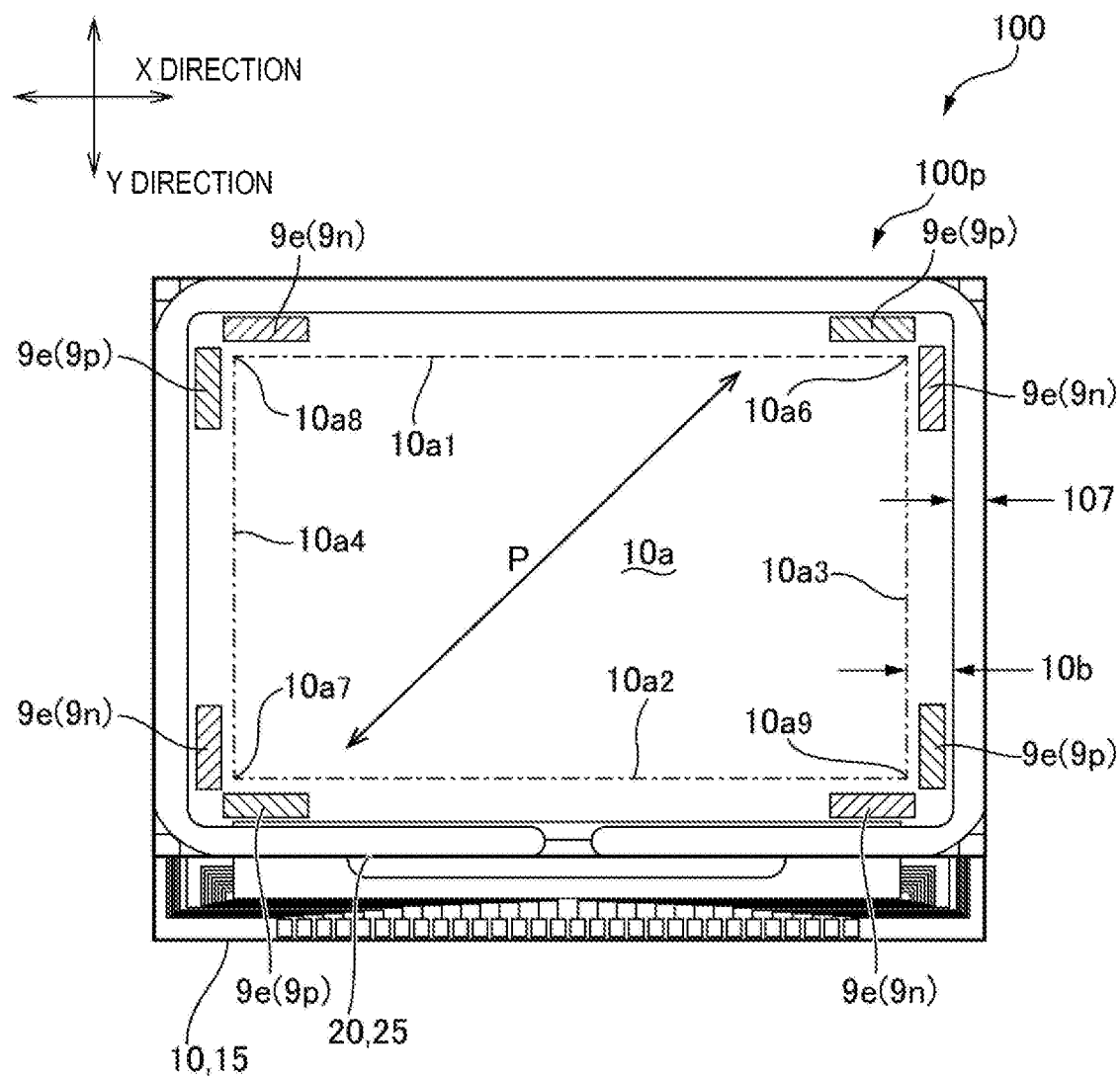
FIG. 7 is an explanatory diagram of a liquid crystal device according to a third embodiment of the present disclosure.

FIG. 7 is an explanatory diagram of a liquid crystal device 100 according to a third embodiment of the present disclosure, in which a configuration of a peripheral electrode 9e, and the like are illustrated. As illustrated in FIG. 7, also in this embodiment, similarly to the first embodiment, a first substrate 15 is provided with, as peripheral electrodes 9e, a first electrode 9p extending along the outer edge of a pixel area 10a at the outside of the pixel area 10a, and a second electrode 9n extending along the outer edge of the pixel area 10a at a position different from that of the first electrode 9p at the outside of the pixel area 10a. A potential higher than a common potential Vcom is applied to the first electrode 9p, and a potential lower than the common potential Vcom is applied to the second electrode 9n.

Also in this embodiment, similarly to the first embodiment, at least one of the first electrode 9p and the second electrode 9n is provided on all of four sides including a first side 10a1, a second side 10a2, a third side 10a3, and a fourth side 10a4 of the pixel area 10a. Further, at least one of the first electrode 9p and the second electrode 9n extends from the outside of all corner portions including a first corner portion 10a6, a second corner portion 10a7, a third corner portion 10a8, and a fourth corner portion 10a9 of the pixel area 10a.

In the embodiment, the first electrode 9p and the second electrode 9n respectively extend in mutually different directions from the outside of the same corner portion, as can be seen in the first corner portion 10a6, the second corner portion 10a7, the third corner portion 10a8, and the fourth corner portion 10a9.

For example, the first electrode 9p extends from the outside of the first corner portion 10a6 along the first side 10a1 partway on the first side 10a1, and the second electrode 9n extends from the outside of the first corner portion 10a6 along the third side 10a3 partway on the third side 10a3. Further, the first electrode 9p extends from the outside of the second corner portion 10a7 along the second side 10a2 partway on the second side 10a2, and the second electrode 9n extends from the outside of the second corner portion 10a7 along the fourth side 10a4 partway on the fourth side 10a4. Furthermore, the first electrode 9p extends from the outside of the third corner portion 10a8 along the fourth side 10a4 partway on the fourth side 10a4, and the second electrode 9n extends from the outside of the third corner portion 10a8 along the first side 10a1 partway on the first side 10a1. Moreover, the first electrode 9p extends from the outside of the fourth corner portion 10a9 along the third side 10a3 partway on the third side 10a3, and the second electrode 9n extends from the outside of the fourth corner portion 10a9 along the second side 10a2 partway on the second side 10a2.

As described above, also in this embodiment, similarly to the first embodiment, the first substrate 15 is provided with the first electrodes 9p to which a potential higher than the common potential Vcom is applied and the second electrodes 9n to which a potential lower than the common potential Vcom is applied. Thus, negative ionic impurities are trapped by the first electrodes 9p and positive ionic impurities are trapped by the second electrodes 9n. Because of this, both the negative ionic impurities and positive ionic impurities can be trapped at the outside of the pixel area 10a. Further, the first electrode 9p and the second electrode 9n respectively extend along different portions of the outer edge of the pixel area 10a and are not parallel to each other. Because of this, both the negative ionic impurities and positive ionic impurities can be efficiently trapped at the outside of the pixel area 10a and the like, whereby effects similar to those in the first and second embodiments may be exhibited.

Fourth Embodiment

Figure 8:
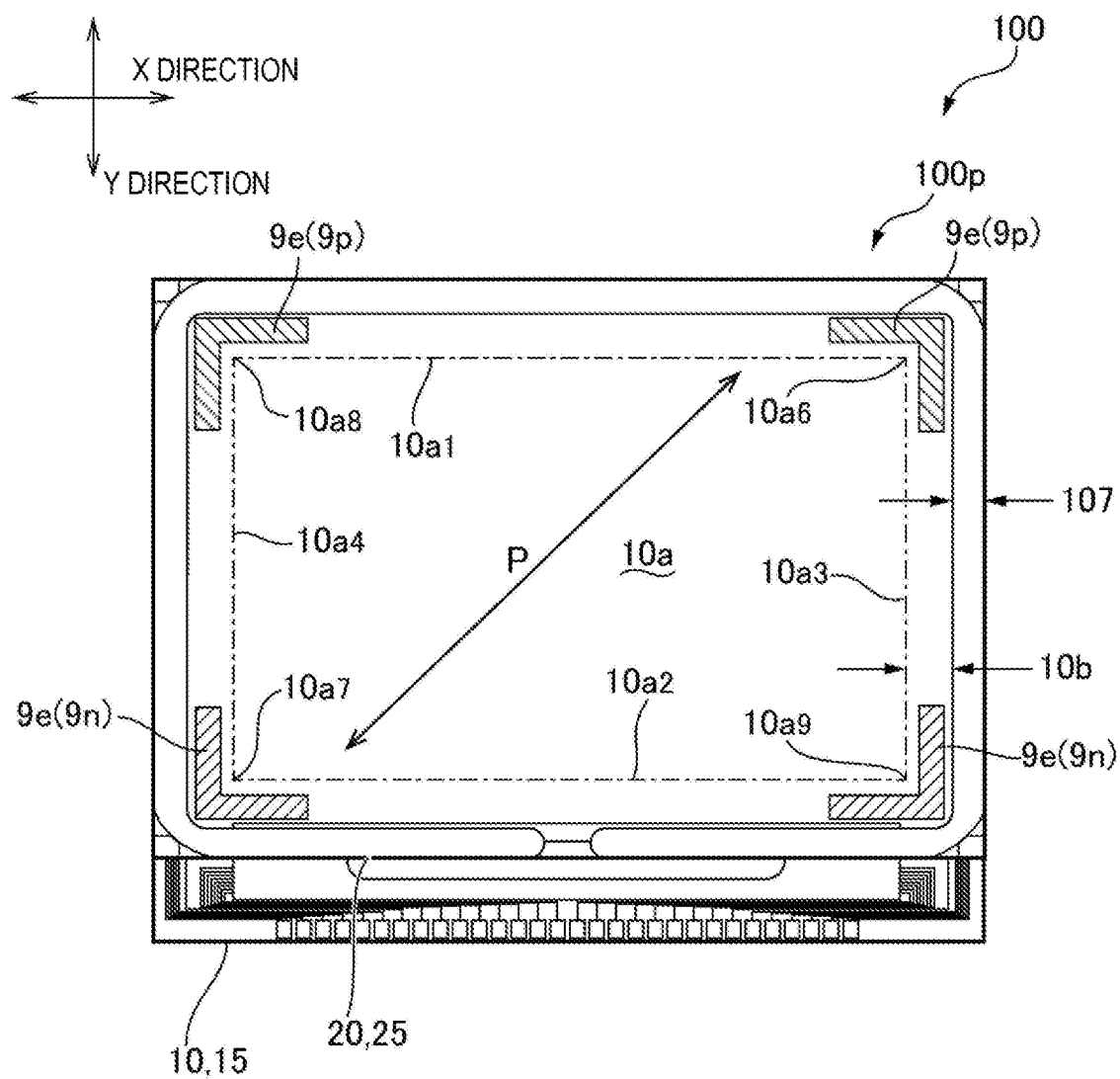
FIG. 8 is an explanatory diagram of a liquid crystal device according to a fourth embodiment of the present disclosure.

FIG. 8 is an explanatory diagram of a liquid crystal device 100 according to a fourth embodiment of the present disclosure, in which a configuration of a peripheral electrode 9e, and the like are illustrated. As illustrated in FIG. 8, also in this embodiment, similarly to the first embodiment, a first substrate 15 is provided with, as peripheral electrodes 9e, a first electrode 9p extending along the outer edge of a pixel area 10a at the outside of the pixel area 10a, and a second electrode 9n extending along the outer edge of the pixel area 10a at a position different from that of the first electrode 9p at the outside of the pixel area 10a. A potential higher than a common potential Vcom is applied to the first electrode 9p, and a potential lower than the common potential Vcom is applied to the second electrode 9n.

Also in this embodiment, similarly to the first embodiment, at least one of the first electrode 9p and the second electrode 9n is provided on all of four sides including a first side 10a1, a second side 10a2, a third side 10a3, and a fourth side 10a4 of the pixel area 10a. Further, at least one of the first electrode 9p and the second electrode 9n extends from the outside of all corner portions including a first corner portion 10a6, a second corner portion 10a7, a third corner portion 10a8, and a fourth corner portion 10a9 of the pixel area 10a.

In the embodiment, the first electrode 9p and the second electrode 9n respectively extend from the outside of different corner portions among the first corner portion 10a6, the second corner portion 10a7, the third corner portion 10a8, and the fourth corner portion 10a9.

To be more specific, the first electrode 9p extends from the outside of the first corner portion 10a6 along the first side 10a1 to a halfway position of the first side 10a1, and also extends from the outside of the first corner portion 10a6 along the third side 10a3 to a halfway position of the third side 10a3. Further, the first electrode 9p extends from the outside of the third corner portion 10a8, adjacent to the first corner portion 10a6 in a first direction X, to a halfway position of the first side 10a1 along the first side 10a1, and also extends from the outside of the third corner portion 10a8 to a halfway position of the fourth side 10a4 along the fourth side 10a4. In contrast, the second electrode 9n extends from the outside of the second corner portion 10a7 along the second side 10a2 to a halfway position of the second side 10a2, and also extends from the outside of the second corner portion 10a7 along the fourth side 10a4 to a halfway position of the fourth side 10a4. Further, the second electrode 9n extends from the outside of the fourth corner portion 10a9, adjacent to the second corner portion 10a7 in the first direction X, to a halfway position of the second side 10a2 along the second side 10a2, and also extends from the outside of the fourth corner portion 10a9 to a halfway position of the third side 10a3 along the third side 10a3.

As described above, also in this embodiment, similarly to the first embodiment, the first substrate 15 is provided with the first electrodes 9p to which a potential higher than the common potential Vcom is applied and the second electrodes 9n to which a potential lower than the common potential Vcom is applied. Thus, negative ionic impurities are trapped by the first electrodes 9p and positive ionic impurities are trapped by the second electrodes 9n. Because of this, both the negative ionic impurities and positive ionic impurities can be trapped at the outside of the pixel area 10a. Further, the first electrode 9p and the second electrode 9n respectively extend along different portions of the outer edge of the pixel area 10a and are not parallel to each other. Because of this, both the negative ionic impurities and positive ionic impurities can be efficiently trapped at the outside of the pixel area 10a and the like, whereby effects similar to those in the first and second embodiments may be exhibited.

Other Exemplary Embodiments

In the above embodiments, although the liquid crystal molecules 50b are aligned in a direction along a diagonal line connecting the first corner portion 10a6 and the second corner portion 10a7 among the four corner portions of the pixel area 10a, the present disclosure may be applied when the liquid crystal molecules 50b are aligned in a direction along a diagonal line connecting the third corner portion 10a8 and the fourth corner portion 10a9. The present disclosure may also be applied when the liquid crystal molecules 50b are aligned in a direction along the first side 10a1 or in a direction along the third side 10a3.

In the embodiments described above, although the present disclosure is applied to the transmission type liquid crystal device 100, the present disclosure may also be applied to a reflection type liquid crystal device.

Installation Example to Electronic Apparatus

Figure 9:
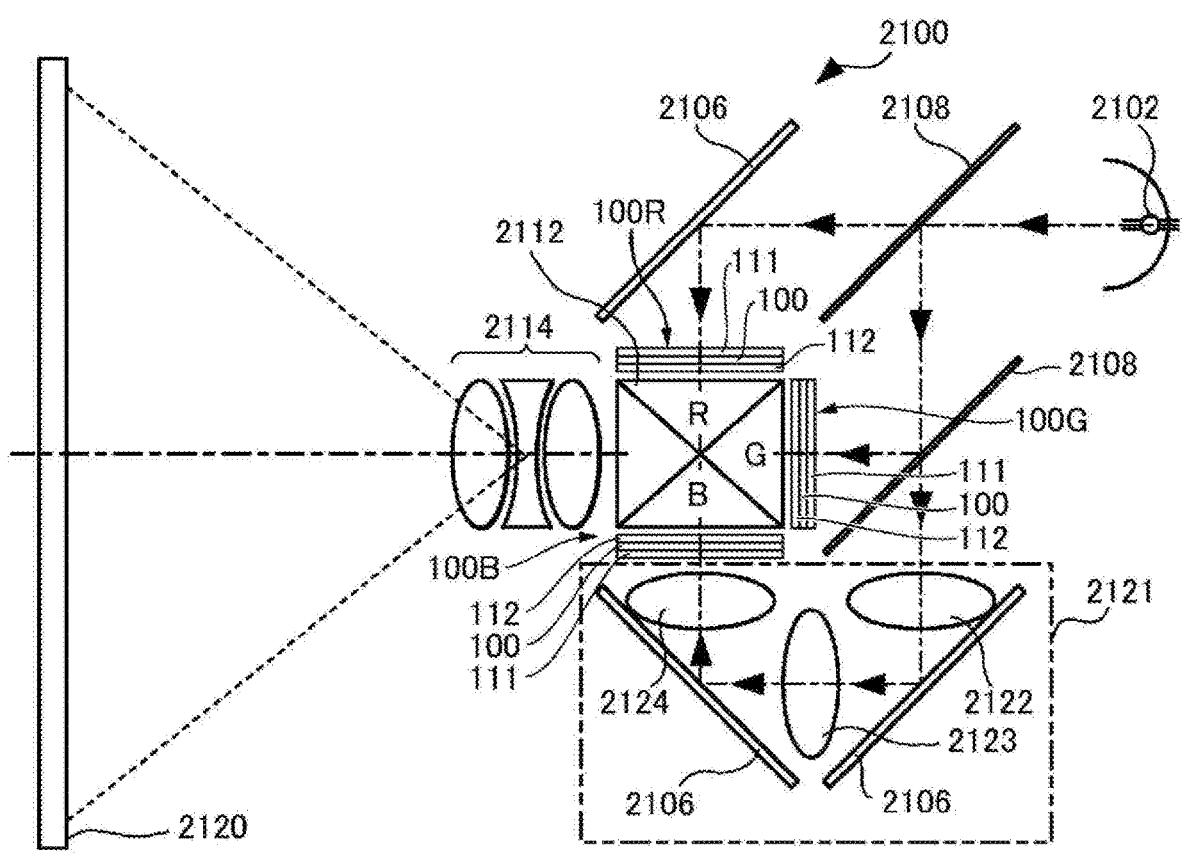
FIG. 9 is an explanatory diagram of a projection-type display apparatus using a transmission type liquid crystal device.

A projection-type display apparatus (liquid crystal projector) as an example of an electronic apparatus using the liquid crystal device 100 according to the embodiments described above will be described. FIG. 9 is an explanatory diagram of a projection-type display apparatus using a transmission type liquid crystal device. A projection-type display apparatus 2100 illustrated in FIG. 9 is provided with the liquid crystal device 100 to which the present disclosure is applied, a light source unit configured to emit light to be supplied to the liquid crystal device 100, and a projection optical system configured to project light modulated by the liquid crystal device 100.

The projection-type display apparatus 2100 is provided with a lamp unit 2102 (light source unit) having a white light source such as a halogen lamp. Projection light emitted from the lamp unit 2102 is split into three primary colors of R (red), G (green), and B (blue) by three mirrors 2106 and two dichroic mirrors 2108 installed inside. The split projection light is guided to light valves 100R, 100G, and 100B corresponding to the primary colors, respectively and modulated. Note that since the light of the B color has a long optical path as compared to the other light of the R color and the G color, the light of the B color is guided via a relay lens system 2121 including an incidence lens 2122, a relay lens 2123, and an emission lens 2124 to prevent a loss due to the long optical path of the light of the B color. Each of the light valves 100R, 100G, and 100B includes an incident-side light polarization separation element 111 overlapping, on the incident side, with the liquid crystal device 100, and an emission-side light polarization separation element 112 overlapping, on the emission side, with the liquid crystal device 100.

The light modulated by each of the light valves 100R, 100G, and 100B is incident on a dichroic prism 2112 from three directions. Then, at the dichroic prism 2112, the light of the R color and the light of the B color are reflected at 90 degrees, and the light of the G color is transmitted. Accordingly, an image of the primary colors are synthesized, and subsequently a color image is projected on a screen 2120 by a projection lens group 2114 (projection optical system).

Other Projection-Type Display Apparatuses

A projection-type display apparatus may be configured to use, as light source units, LED light sources configured to emit light of various colors, and the like so as to supply the light of various colors emitted from the LED light sources to different light valves.

Other Electronic Apparatuses

The electronic apparatus including the liquid crystal device 100 to which the present disclosure is applied is not limited to the projection-type display apparatus 2100 of the above-described embodiment. Examples of the electronic apparatus may include a projection-type head up display (HUD), a direct-view-type head mounted display (HMD), a personal computer, a digital still camera, and a liquid crystal television.

What is claimed is:

1. A liquid crystal device comprising:
a first substrate;
a second substrate opposite the first substrate;
a pixel area where pixels are arranged in a first direction and a second direction intersecting the first direction;
a liquid crystal layer disposed between the first substrate and the second substrate, the liquid crystal layer including liquid crystal molecules aligned in a third direction intersecting the first direction and the second direction in a plan view;
a first electrode which is disposed at an outside of a first corner portion of the pixel area and to which a potential higher than a common potential is applied, the first electrode including a first portion that is disposed adjacent to pixels arranged in the first direction and a second portion that is disposed adjacent to pixels arranged in the second direction, the first portion and the second portion being coupled to each other at the outside of the first corner portion; and
a second electrode which is disposed at an outside of a second corner portion that is positioned diagonally opposite to the first corner of the pixel area and to which a potential lower than the common potential is applied, the second electrode including a third portion that is disposed adjacent to pixels arranged in the first direction and a fourth portion that is disposed adjacent to pixels arranged in the second direction, the third portion and the fourth portion being coupled to each other at the outside of the second corner portion,
wherein no portion of an electrode to which the potential lower than the common potential is applied is disposed at the outside of the first corner portion and no portion of an electrode to which the potential higher than the common potential is applied is disposed at the outside of the second corner portion.

2. The liquid crystal device according to claim 1, wherein the first portion and the third portion extend along all or substantially all of the pixels arranged in the first direction, and
the second portion and the fourth portion extend along all or substantially all of the pixels arranged in the second direction.

3. An electronic apparatus comprising the liquid crystal device according to claim 1.

4. A liquid crystal device comprising:
a first substrate;
a second substrate opposite the first substrate;
a pixel area where pixels are arranged in a first direction and a second direction intersecting the first direction;
a liquid crystal layer disposed between the first substrate and the second substrate, the liquid crystal layer including liquid crystal molecules aligned in a third direction intersecting the first direction and the second direction in a plan view;
a first electrode which is disposed at an outside of a first corner portion of the pixel area and to which a potential higher than a common potential is applied, the first electrode including a first portion that is disposed adjacent to pixels arranged in the first direction and a second portion that is disposed adjacent to pixels arranged in the second direction, the first portion and the second portion being coupled to each other at the outside of the first corner portion; and
a second electrode which is disposed at an outside of a second corner portion that is positioned diagonally opposite to the first corner of the pixel area and to which a potential lower than the common potential is applied, the second electrode including a third portion that is disposed adjacent to pixels arranged in the first direction and a fourth portion that is disposed adjacent to pixels arranged in the second direction, the third portion and the fourth portion being coupled to each other at the outside of the second corner portion,
wherein no portion of an electrode to which the potential lower than the common potential is applied is disposed between the pixel area and the second electrode at the outside of the first corner portion and no portion of an electrode to which the potential lower than the common potential is applied is disposed between the pixel area and the first electrode at the outside of the second corner portion.

\* \* \* \* \*